(12) United States Patent
Eberle, Jr. et al.

(10) Patent No.: US 12,153,273 B2
(45) Date of Patent: Nov. 26, 2024

(54) KEYING FOR CONNECTOR SYSTEMS

(71) Applicants: CommScope Technologies LLC, Hickory, NC (US); CommScope Asia Holdings B.V., Bussum (NL)

(72) Inventors: James Joseph Eberle, Jr., Hummelstown, PA (US); Franciscus Karel Maria Van Geijn, Baarle-Nassau (NL)

(73) Assignees: CommScope Technologies LLC, Hickory, NC (US); CommScope Asia Holdings B.V., DG Bussum (NL)

( * ) Notice: Subject to any disclaimer, the term of this patent is extended or adjusted under 35 U.S.C. 154(b) by 30 days.

(21) Appl. No.: 17/522,531

(22) Filed: Nov. 9, 2021

(65) Prior Publication Data

US 2022/0137314 A1 May 5, 2022

Related U.S. Application Data

(63) Continuation of application No. 15/681,503, filed on Aug. 21, 2017, now abandoned, which is a
(Continued)

(51) Int. Cl.
*G02B 6/38* (2006.01)
*G02B 6/44* (2006.01)

(52) U.S. Cl.
CPC ......... *G02B 6/4471* (2013.01); *G02B 6/3831* (2013.01); *G02B 6/3825* (2013.01); *G02B 6/3882* (2013.01); *G02B 6/3885* (2013.01)

(58) Field of Classification Search
CPC .. G02B 6/4471; G02B 6/3831; G02B 6/3825; G02B 6/3882; G02B 6/3885
(Continued)

(56) References Cited

U.S. PATENT DOCUMENTS 4,781,626 A 11/1988 Lazarchik
4,875,753 A 10/1989 Kalomiris
(Continued)

FOREIGN PATENT DOCUMENTS

EP 0 983 650 10/2002
JP 2002-324941 11/2002

OTHER PUBLICATIONS

Tyco Electronics, Fiber Optic Products Catalog, MPO SECURE Fiber Optic Products, Revised Mar. 2006, 12 pages.
(Continued)

*Primary Examiner* — Kaveh C Kianni
(74) *Attorney, Agent, or Firm* — Merchant & Gould P.C.

(57) ABSTRACT

Keying may be used to indicate various features of cables, cable connectors, and/or equipment. The keying mechanisms of the connectors systems disclosed herein identifies whether each plug is a pinned plug or a pinless plug. The keying mechanisms disclosed herein identify the number of optical fibers terminated at each plug. For example, one type of keying mechanism may indicate a cable plug manufactured under a 40 Gb/sec standard and another type of keying mechanism may indicate a cable plug manufactured under a 100 Gb/sec standard. The keying mechanisms may indicate a cabling/wiring pattern to be used (e.g., indicates a polarity of the cable). The cables and/or plugs may be color coded based on the keying mechanism. Accordingly, the keying may alert a user to the features of the cable that are not readily apparent upon a cursory inspection.

15 Claims, 5 Drawing Sheets

Related U.S. Application Data continuation of application No. 13/780,859, filed on Feb. 28, 2013, now Pat. No. 9,739,971.

(60) Provisional application No. 61/605,498, filed on Mar. 1, 2012.

(58) Field of Classification Search
USPC ........ 385/31, 34, 52, 53, 59, 60, 64, 71, 72, 385/76, 78, 82, 83, 89, 90, 139
See application file for complete search history.

(56) References Cited

U.S. PATENT DOCUMENTS

| | | | |
|---|---|---|---|
| 5,044,994 A | | 9/1991 | Van Woensel |
| 5,167,524 A | | 12/1992 | Falcon et al. |
| 5,335,301 A | | 8/1994 | Newman et al. |
| 5,342,221 A | | 8/1994 | Peterson |
| 5,420,951 A | | 5/1995 | Marazzi et al. |
| 5,521,997 A | | 5/1996 | Rovenolt et al. |
| 5,712,938 A | | 1/1998 | Lin et al. |
| 5,729,644 A | * | 3/1998 | Shiflett ............ G02B 6/4246 385/59 |
| 5,774,611 A | | 6/1998 | Nagase et al. |
| 6,304,352 B1 | | 10/2001 | Cunningham et al. |
| 6,318,909 B1 | | 11/2001 | Giboney et al. |
| 6,422,759 B1 | | 7/2002 | Kevern |
| 6,960,025 B2 | | 11/2005 | Gurreri |
| 7,118,286 B2 | | 10/2006 | Gurreri et al. |
| 7,182,523 B2 | | 2/2007 | Abendschein et al. |
| 7,207,724 B2 | | 4/2007 | Gurreri |
| 7,325,976 B2 | | 2/2008 | Gurreri et al. |
| 7,651,277 B2 | | 1/2010 | Gurreri et al. |
| 7,789,572 B2 | | 9/2010 | Gurreri et al. |
| 8,708,573 B2 | | 4/2014 | Guerreri |
| 8,794,849 B2 | | 8/2014 | Guerreri |
| 8,807,843 B2 | | 8/2014 | Guerreri |
| 8,905,647 B2 | | 12/2014 | Guerreri |
| 8,961,031 B2 | | 2/2015 | Guerreri |
| 9,625,649 B2 | | 4/2017 | Gurreri et al. |
| 9,739,971 B2 | | 8/2017 | Eberle, Jr. et al. |
| 9,791,625 B2 | | 10/2017 | Gurreri |
| 10,495,817 B2 | | 12/2019 | Gurreri |
| 2003/0007717 A1 | | 1/2003 | Chiappetta et al. |
| 2005/0271338 A1 | | 12/2005 | Livingston |
| 2006/0140543 A1 | | 6/2006 | Abendschein et al. |
| 2006/0275007 A1 | | 12/2006 | Livingston et al. |
| 2008/0095502 A1 | | 4/2008 | McColloch |
| 2008/0131055 A1 | | 6/2008 | Parkman et al. |
| 2009/0097846 A1 | | 4/2009 | Kozischek et al. |
| 2009/0098760 A1 | * | 4/2009 | Gurreri ............ G02B 6/3831 439/680 |
| 2010/0322579 A1 | | 12/2010 | Cooke et al. |
| 2011/0052122 A1 | | 3/2011 | Brücher et al. |
| 2011/0058774 A1 | | 3/2011 | Gurreri et al. |
| 2011/0249943 A1 | | 10/2011 | Case et al. |
| 2012/0099822 A1 | | 4/2012 | Kuffel et al. |
| 2012/0163757 A1 | | 6/2012 | Shigehara |
| 2020/0257047 A1 | | 8/2020 | Gurreri |

OTHER PUBLICATIONS

European Search Report for Application No. 13754483.9 mailed Oct. 14, 2015.
International Search Report and Written Opinion for PCT/US2013/028287 mailed Jun. 26, 2013.

* cited by examiner

| Module | | Coupler | | | Cassette | | | Cross-Connect | |
|---|---|---|---|---|---|---|---|---|---|
| | TxRx | PC Ports | T Ports | | PC Ports | T Ports | | XC Ports | C Ports |
| Pin | Yes | NA | NA | | Yes | Yes | | NA | NA |
| Key | No | Yes | No | | Yes | No | | Yes | Yes |

| Jacket Color | Type | Pattern | First End | | | Second End | | | Speed | |
|---|---|---|---|---|---|---|---|---|---|---|
| | | | Color | Pin | Key | Color | Pin | Key | | |
| J1 | Trunk | A | C0 | No | No | C0 | No | No | NA | — 451 |
| J2 | Coupler PC | A | C1 | Yes | K1 | C0 | No | No | 40G | — 452 |
| J2 | Coupler PC | A | C2 | Yes | K2 | C0 | No | No | 100G | — 453 |
| J3 | CC Trunk | A | C3 | Yes | K3 | C3 | Yes | K3 | NA | — 454 |
| J4 | Cassette PC | A | C4 | No | K4 | C0 | No | No | 40G | — 455 |
| J4 | Cassette PC | A | C5 | No | K5 | C0 | No | No | 100G | — 456 |

KEYING FOR CONNECTOR SYSTEMS

CROSS-REFERENCE PARAGRAPH

This application is a continuation of application Ser. No. 15/681,503, filed Aug. 21, 2017, now abandoned, which is a continuation of application Ser. No. 13/780,859, filed Feb. 28, 2013, now U.S. Pat. No. 9,739,971, which application claims the benefit of provisional application Ser. No. 61/605,498, filed Mar. 1, 2012, and titled "Keying for MPO Systems," which applications are incorporated herein by reference in their entirety.

BACKGROUND

Fiber optic communication systems have become increasingly more popular in recent years as fiber optic technology offers several advantages over the conventional copper wire-based technology. For example, fiber optic communication systems provide substantially increased bandwidth, allowing large volumes of data to be transferred quickly over long distances. Additionally, optical communication systems neither generate nor are susceptible to electromagnetic interference (EMI). Fiber optic systems not only are gaining acceptance as the backbone of many network systems, but are also displacing copper wire technology as the preferred medium for connecting various workstations to the network system.

SUMMARY

In accordance with some aspects of the disclosure, keying may be used to indicate various features of cables, cable connectors, and/or equipment. In some implementations, the keying mechanisms of the connector systems disclosed herein identify whether each plug is a pinned plug or a pinless plug. In some implementations, the keying mechanisms of the connector systems disclosed herein identify the number of optical fibers terminated at each plug. For example, one type of keying mechanism may indicate a cable plug manufactured under a 40 Gb/sec standard and another type of keying mechanism may indicate a cable plug manufactured under a 100 Gb/sec standard. In some implementations, the keying mechanisms may indicate a cabling/wiring pattern to be used (e.g., indicates a polarity of the cable). In certain implementations, the cables and/or plugs may be color coded based on the keying mechanism. Accordingly, the keying may alert a user to the features of the cable that are not readily apparent upon a cursory inspection. Tactile indicia on the cable connector or cable can correspond to the respective keying mechanisms, thereby enabling a user to determine features of the cable, connector, or equipment (e.g., pinned or pinless, polarity, number of fibers terminated, etc.) without viewing the front of the connector (e.g., the connector ferrule).

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 8 is a chart listing example equipment and features thereof including keying configurations in accordance with the present disclosure;

FIG. 9 is a chart listing example cables and features thereof including keying configurations in accordance with the present disclosure;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

In general, this disclosure is directed to a connector system that provides discriminating mating among similar, but different, plugs and receptacles by using a system of geometrically matched connector components which allows certain combinations of plugs and receptacles (i.e., mating pairs) to mate while preventing other combinations from mating. In accordance with some aspects of the disclosure, the keying may be used to indicate various features of the cables. Accordingly, the keying may alert a user to the physical features of the cable that are not readily apparent upon a cursory inspection.

Figure 1:
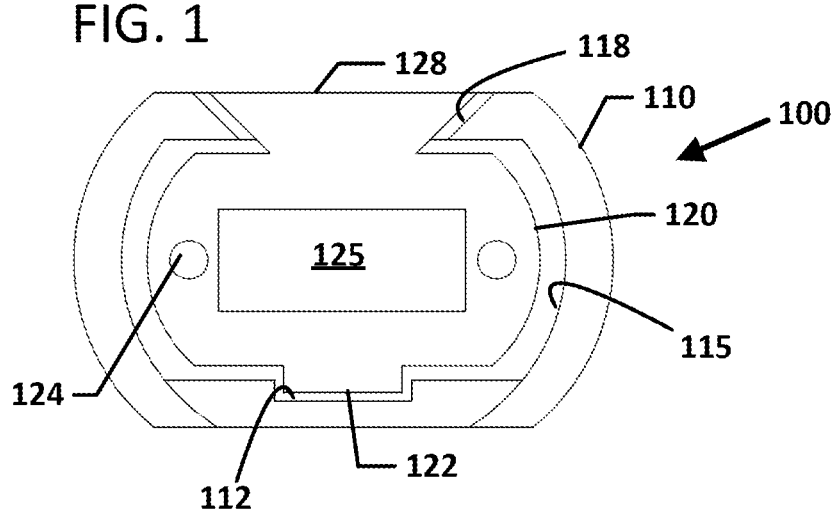
FIG. 1 is a front elevational view of a first example MPO connector system including a plug having a first key and a receptacle defining a first slot in accordance with the present disclosure.
Figure 2:
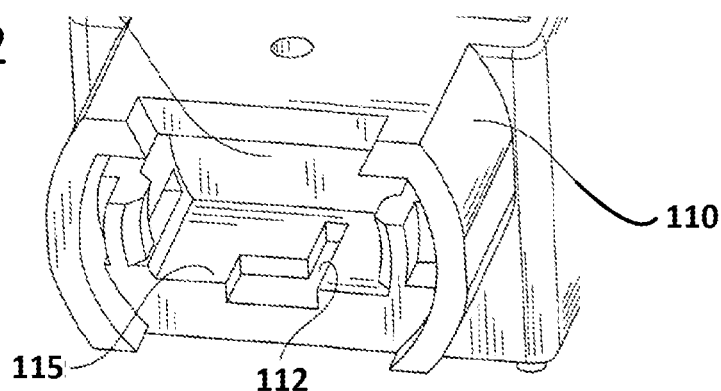
FIG. 2 is a perspective view of an example MPO receptacle.
Figure 3:
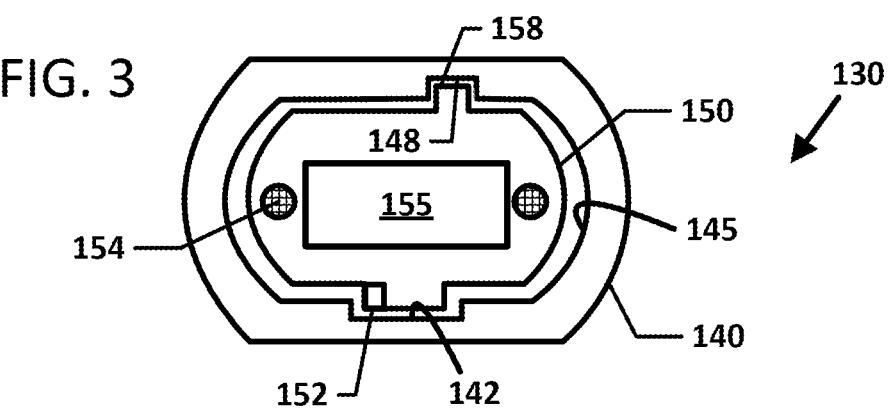
FIG. 3 is a front elevational view of a second example MPO connector system including a plug having a second key and a receptacle defining a second slot in accordance with the present disclosure.

FIGS. 1-3 show two example connector systems 100, 130 that each include a receptacle 110, 140 and a corresponding plug 120, 150. Each receptacle 110, 140 defines a through-passage having an inner surface 115, 145. The through-passage extends between a first port and a second port. The corresponding plug 120, 150 may be received at one of the ports of the receptacle 110, 140, respectively. Each of the plugs 120, 150 includes a ferrule 125, 155 that holds at least one optical fiber. In the example shown, the plugs 120, 150 are MPO-type optical connectors and the ferrules 125, 155 hold multiple optical fibers. It should be noted that the principles of the disclosure are applicable to single-fiber connectors (e.g., SC-type, LC-type, LX.5-type, etc.).

In some implementations, one or both of the ferrules 125, 155 are configured to hold about eight optical fibers in a single row. In other implementations, one or both of the ferrules 125, 155 may be configured to hold about twelve optical fibers in a single row. In other implementations, one or both of the ferrules 125, 155 may be configured to hold about twenty-four optical fibers in two rows. In still other implementations, one or both of the ferrules 125, 155 may be configured to hold a greater or lesser number of optical fibers in one or more rows. In general, a plug 120, 150 terminating a particular number of optical fibers should be mated to another plug 120, 150 terminating the same number of optical fibers.

The inner surfaces 115, 145 of at least one port of each receptacle 110, 140 defines a first geometry. A certain number of receptacles have different first geometries. For example, the receptacle 110 shown in FIGS. 1 and 2 has a different first geometry than the receptacle 140 shown in FIG. 3. An exterior of each plug 120, 150 defines a second geometry. A certain number of plugs have different second geometries. For example, the plug 120 shown in FIG. 1 has a different second geometry than the plug 150 shown in FIG. 3.

In some implementations, each different first geometry of the receptacles 110, 140 corresponds to one, and only one, second geometry of the plugs 120, 150 such that the plugs 120, 150 and receptacles 110, 140 of corresponding first and second geometries are mating pairs. Therefore, the first and second geometries cooperate to allow only certain pairs of plugs 120, 150 and receptacles 110, 140 to mate (herein "mating pairs," "mating plug and receptacle," or "keyed pair"), while physically interfering for all other combinations of plugs 120, 150 and receptacles 110, 140 (herein "non-limiting pairs," "non-mating plugs and receptacles" or "non-keyed pairs"), thereby preventing non-mating plugs and receptacles from effecting an optical or electrical coupling. In other implementations, plugs or receptacles having universal keying (i.e., which may mate to all keys) can be produced.

The first and second geometries may embody any known keying mechanism that discriminates between connector components. Such keying mechanisms include, for example, a key and slot relationship between the plug 120, 150 and receptacle 110,140, a receptacle 110, 140 dimensioned to receive only certain sized or shaped plugs 120, 150, and even a magnetic signature for either attracting (for mating pairs) and repulsing (non-mating pairs). In some implementations, the keying mechanism involves just a slight modification to the plug 120, 150 and jack 110, 140 such that essentially the same molds can be used to manufacture connectors of different keyed pairs. Although molding is preferred, it is should be understood that other techniques for producing the first and second geometries can be used including, for example, over molding and machining.

In some implementations, the plugs 120, 150 and receptacles 110, 140 use a key and slot mechanism. For simplicity, the term "keying elements" as used herein refers collectively to the key and the slot. Specifically, the slot can be embodied in the first or second geometry and the key can be embodied in the other geometry. In the example shown in FIGS. 1 and 3, the key 122, 142 is part of the second geometry of the plug 120, 150, while the slot 112, 142 is part of the first geometry of the receptacle 110, 140. In certain implementations, the plugs 120, 150 and receptacles 110, 140 also include one or more additional keys 128, 158 and slots 118, 148, respectively. The combination of the first and second keys increases the number of possible permutations within a given connector system 100.

Some types of plugs 120, 150 and receptacles 110, 140 are keyed for rotational alignment (i.e., so the plug may be inserted in only one rotational orientation). This type of keying may be referred to as polarization. For example, MPO-type plug connectors may include a key that aligns with a slot in the receptacle. In certain implementations, the keying elements described herein refer to keying elements in addition to the rotational alignment keys of the connector systems. In certain implementations, the keying elements described herein refer to modifications made to the rotational alignment keys of the connector systems. For example, in FIG. 2, the slot 112 of receptacle 110 includes a first portion that mates with a conventional rotational alignment key and a second narrow portion that extends into the receptacle. As the term is used herein, a "keyless" plug connector does not indicate that the plug connector is devoid of rotational alignment keys. Rather, the term "keyless" indicates that the plug connector does not have an additional or modified keying mechanism as described herein.

As shown in FIGS. 1 and 3, MPO-type plug connectors 120, 150 have male and female configurations adapted to be mated together. For example, the plug 120 shown in FIG. 1 includes alignment pins 124 (i.e., is a "pinned" connector) and the plug 150 shown in FIG. 3 defines alignment holes 154 (i.e., is a "pinless" connector). To form an optical connection between the optical fibers terminated at the first plug 120 and the optical fibers terminated at the second plug 150, the ferrules 125, 155 are aligned by mating the pins 124 of the first plug 120 into the holes 154 of the second plug 150. Damage can occur when a pinned connector is interfaced with another pinned connector. The optical signal (and hence system performance) may be poor when a pinless connector is interfaced with another pinless connector since the ferrules may be misaligned. Also, damage can occur during mating of two pinless ferrules, two ferrules with different fiber counts, and/or two ferrules having different endface geometries.

In some implementations, the keying mechanisms of the connectors systems disclosed herein identifies whether each plug 120, 150 is a pinned plug or a pinless plug. In some implementations, the keying mechanisms of the connectors systems disclosed herein identifies the number of optical fibers terminated at each plug 120, 150. For example, one type of keying mechanism may indicate a cable plug manufactured under a 40 Gb/sec standard and another type of keying mechanism may indicate a cable plug manufactured under a 100 Gb/sec standard. In some implementations, the keying mechanisms may indicate a cabling/wiring pattern to be used (e.g., indicates a polarity of the cable). In certain implementations, the cables and/or plugs may be color coded based on the keying mechanism.

Accordingly, the keying mechanism may be used to track and manage which plugs 120, 150 should be inserted into what receptacles 110, 140. To better illustrate the principles of the disclosure, a schema to be followed when cabling an optical system will be described with reference to four example systems. Following the example schema will result in a system configuration that inhibits a user from attempting to mate two components that should not be mated together. For example, cabling the optical system based on the following rules will inhibit a user from connecting two pinned components (e.g., two plugs, a plug and a transceiver, etc.), two pinless components (e.g., two plugs), components having different numbers of optical fibers (e.g., a 40 Gb/sec component and a 100 Gb/sec component), components having different wiring patterns (a type-A plug and a type-B plug), etc.

Figure 4:
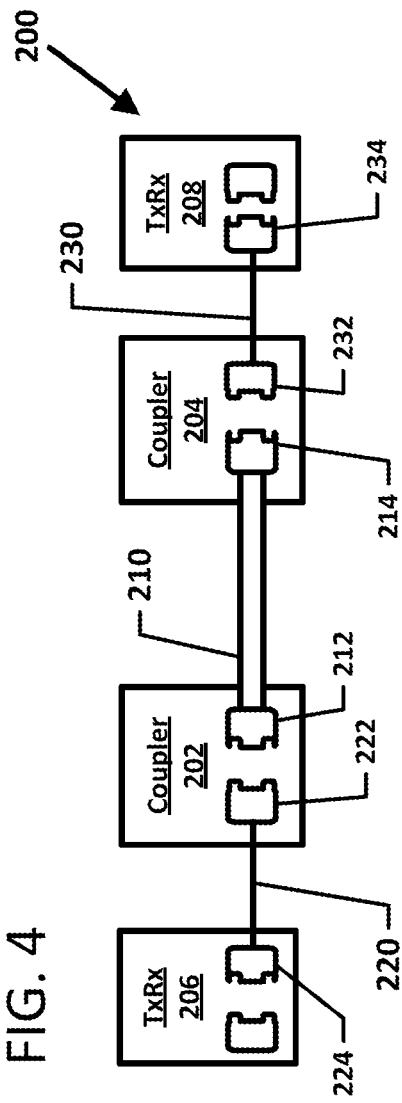
FIG. 4 is a block schematic diagram of an example fiber optic system including couplers that may benefit from the keying system disclosed herein.
Figure 5:
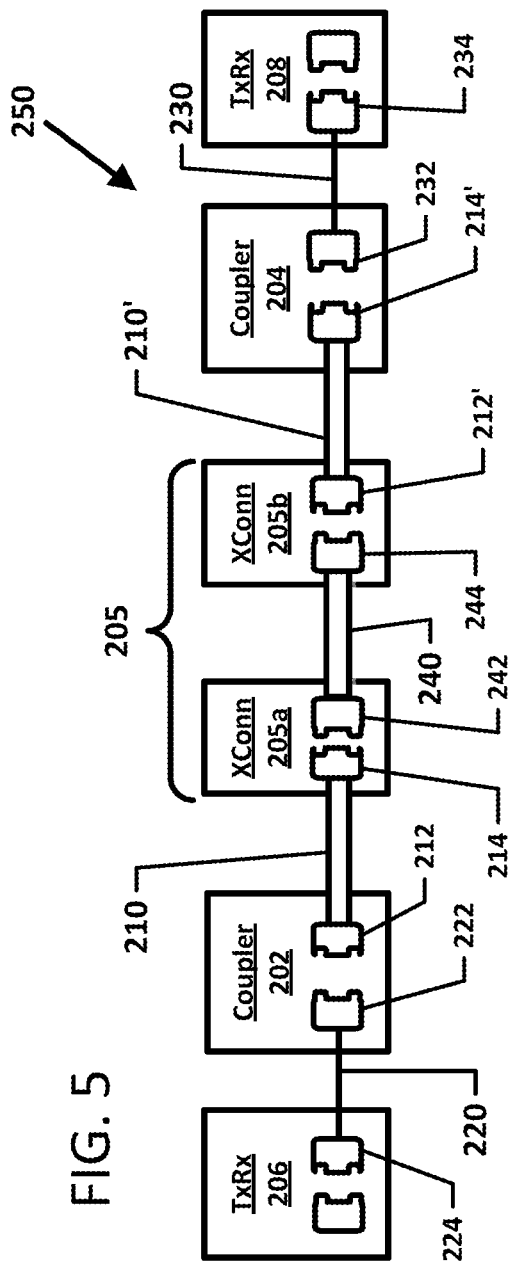
FIG. 5 is a block schematic diagram of an example fiber optic system including couplers and a cross-connect arrangement that may benefit from the keying system disclosed herein.

FIGS. 4-7 illustrate various implementations of a system configuration using keyed plugs 120, 150 and receptacles 110, 140 to manage which plugs 120, 150 should be inserted into what receptacles 110, 140. FIGS. 4 and 5 show implementations of system configurations that include connections between a first optical coupler 202 and a second optical coupler 204. As the terms are used herein, an optical coupler 202, 204 includes one or more adapters that are each configured to align and optically connect a first optical plug connector to a second optical plug connector. For example, in the optical system 200 of FIG. 4, each coupler 202, 204 connects a trunk cable 210 to one or more patchcords 220, 230, which are routed to transceivers (TxRx) 206, 208, respectively. As the term is used herein, an optical transceiver is a device that performs, within one chassis or housing, both telecommunication transmitting and receiving functions. The transceiver may communicate optical signals carried over cables to telecommunications or optical equipment (e.g., switches, routers, etc.). Accordingly, the optical system 200 optically couples the first transceiver 206 to the second transceiver 208.

Each patchcord 220, 230 extends between a first terminated end 222, 232 and a second terminated end 224, 234. The first end 222, 232 of each patchcord 220, 230 is plugged into a port of the respective coupler 202, 204. The second end 224, 234 of each patchcord 220, 230 is plugged into a port of the respective transceiver 206, 208. In the example shown, a trunk cable 210 extends between the first coupler 202 and the second coupler 204. The trunk cable 210 has a first terminated end 212 and a second terminated end 214. The first terminated end 212 is configured to plug into another port at the first coupler 202. The second terminated end 214 is configured to plug into another port at the second coupler 204.

In FIG. 5, one example optical system 250 includes a cross-connect 205 that is optically positioned between the first and second couplers 202, 204 of optical system 200. In the example shown, the cross-connect 205 includes a first coupler 205a and a second coupler 205b. A first trunk cable 210 extends between the first coupler 205a of the cross-connect 205 and the first coupler 202. Another first trunk cable 210' extends between the second coupler 205b of the cross-connect 205 and the second coupler 204. One or more cross-connect trunk cables 240 extend between the first and second cross-connect couplers 205a, 205b. Accordingly, optical connections within the optical system 250 may be modified by changing connections between the first and second cross-connect couplers 205a, 205b.

Figure 6:
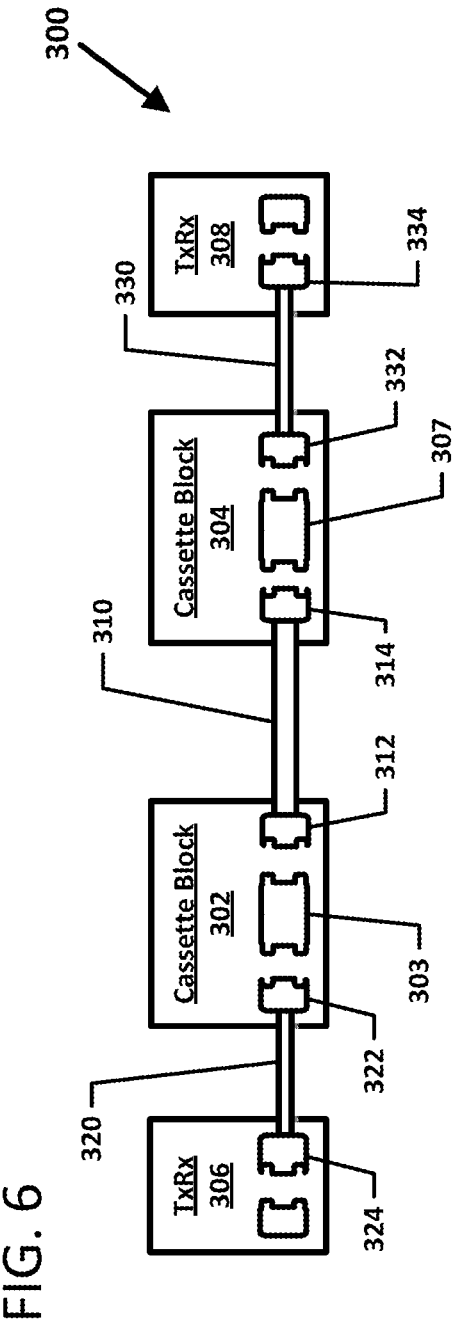
FIG. 6 is a block schematic diagram of an example fiber optic system including cassette arrangements that may benefit from the keying system disclosed herein.
Figure 7:
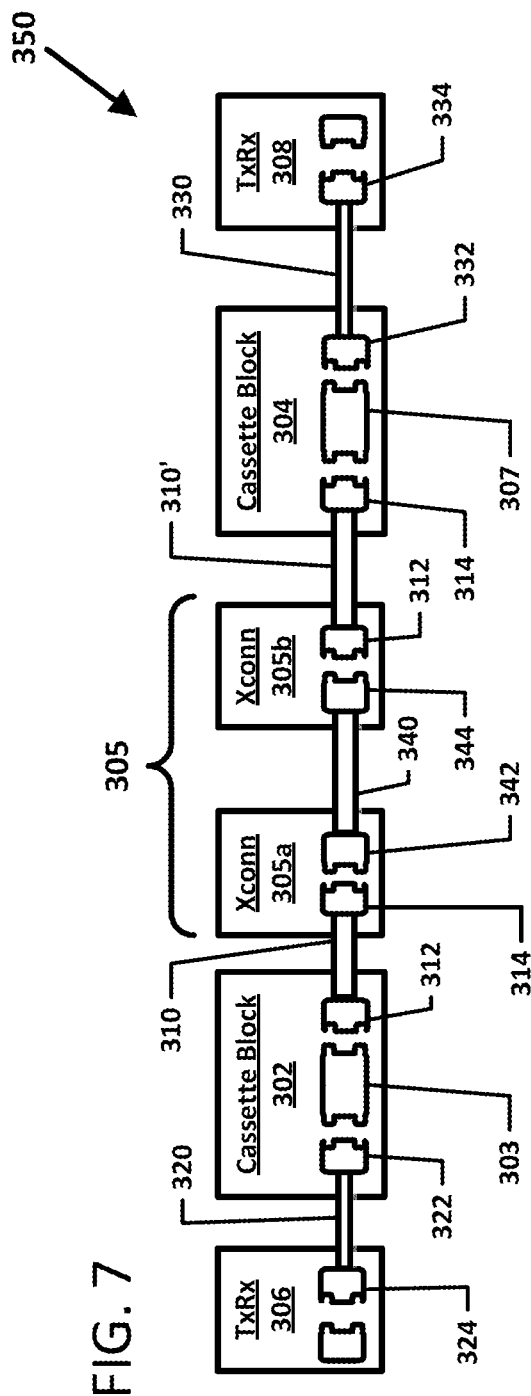
FIG. 7 is a block schematic diagram of an example fiber optic system including cassette arrangements and a cross-connect arrangement that may benefit from the keying system disclosed herein.

FIGS. 6 and 7 show implementations of system configurations 300, 350 that include connections between a first optical cassette arrangement 302 and a second optical cassette arrangement 304. Each cassette arrangement 302, 304 includes one or more cassettes 303, 307, respectively. Each cassette 303, 307 includes internal circuitry (e.g., cabling, optical splitters, wave division multiplexers, fanouts, etc.) that connects at least a first optical plug connector to at least a second optical plug connector. For example, in the optical system 300 of FIG. 6, each cassette arrangement 302, 304 connects a trunk cable 310 to one or more patchcords 320, 330, which are routed to transceivers (TxRx) 306, 308, respectively.

Each patchcord 320, 330 extends between a first terminated end 322, 332 and a second terminated end 324, 334. The first end 322, 332 of each patchcord 320, 330 is plugged into a port of the respective cassette arrangement 302, 304. The second end 324, 334 of each patchcord 320, 330 is plugged into a port of the respective transceiver 306, 308. In the example shown, the trunk cable 310 extends between the first coupler 302 and the second coupler 304. The trunk cable 310 has a first terminated end 312 and a second terminated end 314. The first terminated end 312 is configured to plug into another port at the first cassette arrangement 302. The second terminated end 314 is configured to plug into another port at the second cassette arrangement 304. Accordingly, the optical system 300 optically couples the first transceiver 306 to the second transceiver 308.

In FIG. 7, one example optical system 350 includes a cross-connect 305 that is optically positioned between the first and second cassette arrangements 302, 304 of optical system 300. In the example shown, the cross-connect 305 includes a first coupler 305a and a second coupler 305b. A first trunk cable 310 extends between the first coupler 305a of the cross-connect 305 and the first cassette arrangement 302. Another first trunk cable 310' extends between the second coupler 305b of the cross-connect 305 and the second cassette arrangement 304. One or more cross-connect cables 340 extend between the first and second cross-connect couplers 305a, 305b. Accordingly, optical connections within the optical system 350 may be modified by changing connections between the first and second cross-connect couplers 305a, 305b.

One example keying schema applied to each of the four optical systems described above is provided in chart form in FIGS. 8 and 9. A chart 400 of FIG. 8 lists the schema rules for various equipment or non-cable components within an optical system. For example, FIG. 8 provides configurations for optical couplers, optical cassette arrangements, optical transceivers, and optical cross-connects.

As shown in FIG. 8, under the schema disclosed herein, transceivers (e.g., transceivers 206, 208 of FIGS. 4 and 5, transceivers 306, 308 of FIGS. 6 and 7, etc.) are not keyed other than rotational alignment keys. Both the couplers (e.g., couplers 202, 204 of FIGS. 4 and 5) and the cassette arrangements (e.g., cassette arrangements 302, 304 of FIGS. 6 and 7) have at least one keyed port and at least one non-keyed port. Each keyed port is configured to receive a plug with a matching key. The non-keyed port is configured to receive a plug that is not keyed other than for rotational alignment. The cross-connect (e.g., cross-connect 205 of FIG. 5 and cross-connect 305 of FIG. 7) includes at least two keyed ports.

In general, plugs routed to one side of the couplers 202, 204 are directly interfaced with plugs routed to another side of the coupler 202, 204. For example, in FIG. 4, the first end 212 of the trunk cable 210 is directly interfaced to the second end 222 of the first patchcord 220. Because the couplers 202, 204 enable direct connections between plugs, the couplers 202, 204, themselves, are neither pinned nor pinless. In other words, the ports of the couplers 202, 204 may receive both pinned and pinless plugs. Similarly, the cross-connects 205, 305 also are neither pinned nor pinless.

In contrast, the cassette arrangements 302, 304 indirectly connect two or more plugs via a cassette 303, 307, respectively. Each cassette 303, 307 is configured to connect directly to two or more plugs. Accordingly, under the schema disclosed herein, both of the ports of the cassette 303, 307 are pinned (i.e., configured to receive only non-pinned connectors). Under the schema, the receptacles of the transceivers 206, 208, 306, 308 also are pinned (see the chart 400 of FIG. 8).

A chart 450 of FIG. 9 lists the configuration rules for various optical cables within an optical system. Each cable listed in chart 450 extends between a first plug connector (i.e., first terminated end) and a second plug connector (i.e., a second terminated end). In general, the plug connectors that are pinned are also keyed. The plug connectors that are pinless do not have a key. The key mechanism of each keyed end may vary so that the plug connector may be mated only with another plug or piece of equipment having the same speed and cable pattern, and having the opposite male/female configuration as the plug connector. Each connectorized end also may be colored in accordance with the keying configuration. In some implementations, the cable includes a jacket that also may be color-coded to indicate various features of the cable as will be described herein.

A first cable 451 listed in chart 450 is a trunk cable having a type-A cabling pattern. The first cable 451 is configured for use as trunk cable 210, 210' of FIGS. 4 and 5 and trunk cable 310, 310' of FIGS. 6 and 7. Both ends of the trunk cable 451 are not pinned and not keyed. In certain implementations, both ends of the trunk cable 451 have a first color C0. In some implementations, a jacket of the first cable 451 may have the same color C0 as the plugs terminating the ends of the cable 451. In other implementations, the jacket of the first cable 451 may have a jacket color J1 that indicates that the cable is a trunk cable. In certain implementations, the colors of the plugs and/or the jacket of a similar trunk cable having a type-B cabling pattern may change to indicate that the cable supports the type-B cabling pattern.

Second and third cables 452, 453 listed in the chart 450 are patchcords each having a type-A cabling pattern. The second cable 452 is a patchcord configured in accordance with a 40 Gb/sec standard and, accordingly, has eight active optical fibers. The third cable 453 is a patchcord configured in accordance with a 100 Gb/sec standard and, accordingly, has twenty active optical fibers. Otherwise, the patchcords 452, 453 are identical. Both the second cable 452 and the third cable 453 are configured for use as any of patchcords 220, 230 of FIGS. 4 and 5.

A first end of each patchcord 452, 453 is pinned and a second end of each patchcord 452, 453 is not pinned. For example, as shown in FIG. 4, the first end 222, 232 of each patchcord 220, 230 is pinned to interface with the pinless end 212, 214, respectively, of the trunk cable 210. The second end 224, 234 of each patchcord 220, 230 is pinless to interface with the pinned transceiver 206, 208. As noted above, the pinless plug of the patchcords 452, 453 is not keyed. The pinned plug of the patchcords 452, 453 is keyed. The key mechanism K1 of the first patchcord 452 differs from the key mechanism K2 of the second patchcord 453 to distinguish the number of fibers in each cable.

In certain implementations, the pinless, keyless plug of each patchcord 452, 453 may have the same color. In the example shown in FIG. 9, this color may also match the color C0 of the pinless, keyless plug of the trunk cable 451. In such implementations, this color C0 may indicate any plug that is both pinless and keyless. In other implementations, however, the pinless, keyless plug of the patchcords 452, 453 may have a different color than the trunk cable plug to indicate that the plug terminates a patchcord. The pinned, keyed plug of the first patchcord 452 may have a color C1 that differs from a color C2 of the pinned, keyed plug of the second patchcord 453 to distinguish the two types of cables. The colors C1, C2 of the pinned, keyed plugs of both patchcords 452, 453 differ from the color C0 of the pinless, keyless plug.

The patchcord 452 also may have a jacket color J2 that differs from jacket color J1 to indicate that the cable is a patchcord and not a trunk cable. In some implementations, the jacket color J2 may differ from any of the plug colors C0, C1, C2. In other implementations, the jacket color J2 may match one of the plug colors C0, C1, C2. In certain implementations, the colors of the plugs and/or the jacket of similar patchcords having a type-B cabling pattern may change to indicate that the cable supports the type-B cabling pattern. In certain implementations, the key mechanism K1, K2 of each cable 452, 453 also may change to indicate the cabling pattern.

A fourth cable 454 listed in chart 450 is a cross-connect (i.e., XConn) trunk cable having a type-A cabling pattern. The fourth cable 454 is configured for use as cross-connect trunk cable 240, 340 of FIGS. 5 and 7. Both ends of the cross-connect trunk cable 454 are pinned and keyed. In some implementations, both ends have the same keying mechanism K3. In such implementations, both ends have the same plug color C3 to identify the keying mechanism K3. In other implementations, however, the first end may have a different keying mechanism than the second end. In such implementations, each plug connector may have a different color.

In some implementations, the keying mechanism K3 of the fourth cable 454 differs from the keying mechanisms K1, K2 of the patchcords 452, 453. In other implementations, however, fourth cable 454 may share a keying mechanism with one of the patchcords 452, 453. In some implementations, a jacket of the fourth cable 454 may have a color J3 that differs from the color J1 of the first cable 451 to distinguish a cross-connect trunk cable from a non-cross-connect trunk cable. Accordingly, a user will not attempt to plug a pinned end of a cross-connect trunk cable into the pinned end of a patchcord 452, 453. Rather, the color J3 of the jacket user will alert the user that the cable is pinned at both ends since it is a cross-connect patchcord. In certain implementations, the colors of the plugs and/or the jacket of a similar cross-connect trunk cable having a type-B cabling pattern may change to indicate that the cable supports the type-B cabling pattern.

Fifth and sixth cables 455, 456 listed in the chart 450 are patchcords each having a type-A cabling pattern. The fifth cable 455 is a patchcord configured in accordance with a 40 Gb/sec standard and, accordingly, has eight active optical fibers. The sixth cable 455 is a patchcord configured in accordance with a 100 Gb/sec standard and, accordingly, has twenty active optical fibers. Otherwise, the patchcords 455, 456 are identical. Both the fifth cable 455 and the sixth cable 456 are configured for use as any of patchcords 320, 330 of FIGS. 6 and 7.

Both ends of the fifth and sixth patchcords 455, 456 are pinless. Accordingly, as shown in FIG. 6, the pinless first end 322, 332 of each patchcord 320, 330 interfaces with the pinned end of the cassette 303, 307 of the respective cassette arrangement 302, 304. The second end 324, 334 of each patchcord 320, 330 is pinless to interface with the pinned transceiver 306, 308. In some implementations, the plugs of the patchcords 455, 456 are pinless following the general rule stated above. In the example shown, however, one of the plugs of each patchcord 455, 456 is keyed to mate with a keyed receptacle of the respective cassette arrangement 302, 304. In some such implementations, the key mechanism K4 of the patchcord 455 differs from the key mechanism K5 of the patchcord 456 to distinguish the number of fibers in each cable 455, 456.

In certain implementations, the pinless, keyless plug of each patchcord 455, 456 may have the same color. In the example shown in FIG. 9, this color may also match the color C0 of the pinless, keyless plug of the patchcords 452, 453. In other implementations, however, the pinless, keyless plug of the patchcords 455, 456 may have a different color than the patchcords 452, 453 to indicate that both ends are pinless. The keyed plug of the fifth cable 455 may have a color C4 that differs from a color C5 of the keyed plug of the sixth cable 456 to distinguish the two types of cables. The colors C5, C6 of the keyed plugs of both patchcords 455, 456 differ from the color C0 of the pinless, keyless plug. In certain implementations, the colors C5, C6 of the keyed plugs of both patchcords 455, 456 differ from the colors C1, C2 of the pinned, keyed plugs of the patchcords 452, 453.

In some implementations, both patchcords 455, 456 have the same jacket color J4 to indicate that they are patchcords (as opposed to trunk cables). In certain implementations, the jacket color J4 differs from the jacket colors J1, J3 of the trunk cables 451, 454 to distinguish the fifth and sixth cables 455, 456 as patchcords. In certain implementations, the jacket color J4 differs from the jacket color J2 of the patchcords 452, 453 to distinguish the fifth and sixth cables 455, 456 as patchcords configured to plug into cassette arrangements (or other indirect connections) instead of couplers (or other direct connections). In certain implementations, the colors of the plugs and/or the jacket of similar patchcords having a type-B cabling pattern may change to indicate that the cable supports the type-B cabling pattern.

The example charts 400, 450 shown in FIGS. 8 and 9 are provided only for illustrative purposes. Modifications could be made to the schema in keeping with the principles of the disclosure. For example, cross-connect cables 454 may have different keying to distinguish the cables by speed (i.e., fiber count). Patchcords 452, 453, 455, 456 and cross-connect cables 454 also may have additional keying implementations to distinguish cables configured for 10 Gb/sec or any other speed.

In accordance with some aspects of the disclosure, one or more cables (e.g., trunk cables, patchcords, etc.) may include tactile indicia that correspond to the respective keying mechanisms of the cable. Accordingly, a user can touch the tactile indicia to determine features (e.g., pinned or pinless, polarity, number of fibers terminated, etc.) without viewing the keying region of the cable connector. In certain implementations, a user can use the tactile indicia to determine the cable features while the connector is plugged into a receptacle.

In some implementations, the tactile indicia are disposed on the connector plug terminating the cable. In certain implementations, the tactile indicia are located towards a rear of the connector plug. In other implementations, the tactile indicia are disposed on the strain relief for the connector plug. In still other implementations, the tactile indicia can be disposed on the adapter or adapter panel configured to receive the connector plug. In some implementations, the tactile indicia can be formed with the connector plug or adapter (e.g., molded, stamped, etc.).

In other implementations, the tactile indicia can be added after the initial formation of the plug or adapter (e.g., cut, etched, etc.). In certain implementations, the tactile indicia can be added in the field. For example, the tactile indicia can be added as an adhesive-backed sticker, a snap-on tab, or other such add-on part. In certain implementations, the tactile indicia could be removable to accommodate a network reconfiguration to migrate data rates, media, etc.

The tactile indicia can include one or more protrusions (e.g., bumps) and/or depressions. In certain implementations, multiple tactile indicia can form unique patterns that are associated with the specific keying mechanism on the connector. In some implementations, the tactile indicia can differentiate between various features based on the size, shape, number, and/or location of the indicia or pattern. For example, the shape of a protrusion or depression could be varied in two or three dimensions (e.g., round, square, spherical, cubical, dodecahedral, etc.).

In an example, a large bump may indicate a multimode cable and a small bump may indicate a single mode cable. In an example, a single bump may indicate a twelve fiber cable and two bumps may indicate a twenty-four fiber cable. In an example, a bump disposed towards a left side of the connector may indicate a first polarity and bump disposed towards a right side of the connector may indicate a second polarity. In an example, a bump disposed at a top of the connector may indicate an angle polished connector (APC) and a bump disposed at a bottom of the connector may indicate an Ultra-Physical Contact (UPC) connector. In an example, a lack of tactile indicia may indicate a standard connector.

Figure 10:
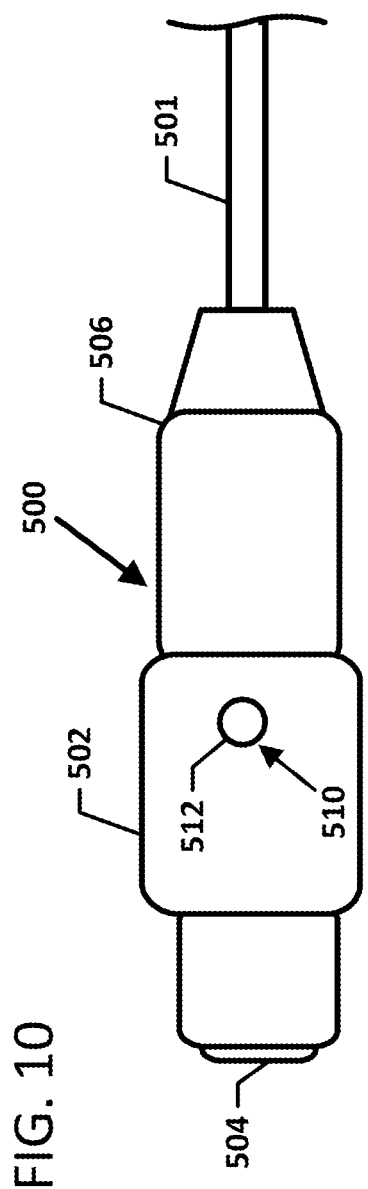
FIG. 10 is a plan view of an example connector having first example tactile indicia.
Figure 11:
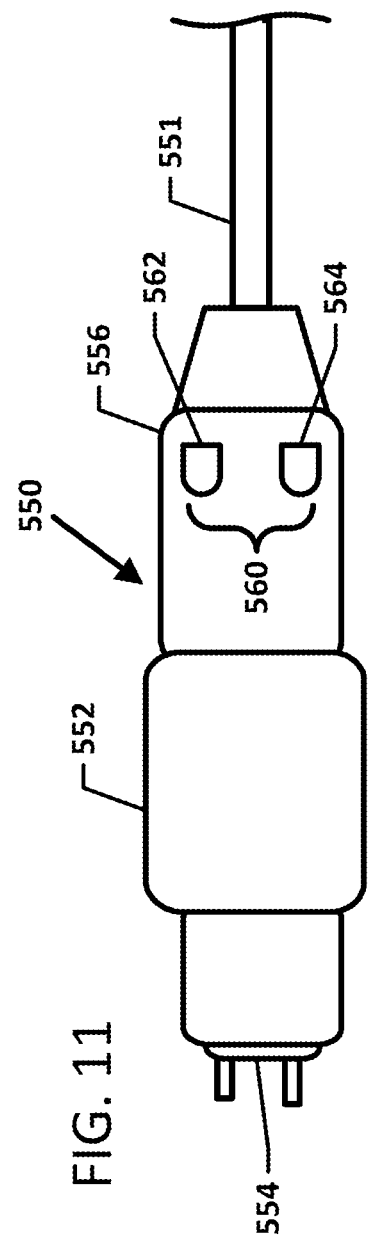
FIG. 11 is a plan view of another example connector having second example tactile indicia.

For example, FIGS. 10 and 11 illustrate two example connectors 500, 550 having different examples of tactile indicia 510, 560. Each connector 500, 550 terminates an optical fiber or cable 501, 551, respectively. Both connectors 500, 550 include plug bodies 502, 552 holding optical ferrules 504, 554, respectively. Strain relief boots 506, 556 extends from the plug bodies 502, 552, respectively. In the examples shown, the connectors 500, 550 are MPO-type connectors. In other implementations, however, the connectors 500, 550 can be any desired type of connector (e.g., an LC-type connector, an SC-type connector, and LX.5-type connector, etc.).

The first connector 500 includes the tactile indicia 510 disposed on the plug body 502. The tactile indicia 510 includes a single bump or depression 512 shaped like a flat circle or a hemisphere. The bump or depression 512 is located at a central location at a rear of the plug body 502. The tactile indicia 510 can indicate one or more features of the connector 500 and/or cable 501. For example, the single bump or depression 512 can indicate that the cable 501 has twelve fibers. The circular or spherical shape of the bump or depression 512 can indicate that the connector 500 is pinless. The central location can indicate that the connector is an APC. In other implementations, these indicia features may indicate other information about the connector 500.

The second connector 550 includes the tactile indicia 560 disposed on the strain-relief portion 556 of the connector 550. The tactile indicia 560 includes two elongated bumps or depressions 562, 564. The first bump or depression 562 is located towards one side of the connector 550 and the second bump or depression 564 is located towards another side of the connector 550. The tactile indicia 560 can indicate one or more features of the connector 550 and/or cable 551. For example, the two bumps or depressions 562, 564 can indicate that the cable 551 has twenty-four fibers. The elongated shape of the bumps or depressions 562, 564 can indicate that the second connector 550 is pinned. In other implementations, these indicia features may indicate other information about the connector 550.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A fiber plug connector configured to be inserted into a receptacle, the fiber plug connector and the receptacle cooperating to define a keying mechanism, the fiber plug connector comprising:
   a body extending along a length between a front and a rear, along a width between opposite first and second sides, and along a height between a top and a bottom;
   a pin alignment system including either a pair of pins or a pair of holes to receive pins, the pin alignment system recessed inwardly from an exterior of the body;

a ferrule disposed at the front of the body, the ferrule being configured to hold a number of optical fibers;

an exterior key positioned at the exterior of the body, the exterior key being asymmetrically disposed at the top of the body between the first and second sides, the exterior key having a keying geometry identifying the number of the optical fibers held by the ferrule, the exterior key being disposed at a location offset along the width from a central longitudinal axis, the location also being offset along the width from both the first side of the body and the second side of the body; and tactile indicia that correspond to the keying geometry of the exterior key, wherein the tactile indicia is disposed at the rear of the body to enable a user to determine the number of fibers terminated by the fiber plug connector even when the fiber plug connector is received in the receptacle.

2. The fiber plug connector as claimed in claim 1, wherein the exterior key also indicates a rotational alignment of the fiber plug connector.

3. The fiber plug connector as claimed in claim 1, wherein the fiber plug connector is color coded based on the keying geometry of the exterior key.

4. The fiber plug connector as claimed in claim 1, wherein the fiber plug connector terminates a patchcord.

5. The fiber plug connector as claimed in claim 1, wherein the exterior key is disposed at the front of the body.

6. The fiber plug connector as claimed in claim 1, wherein the fiber plug connector is an MPO-type connector.

7. The fiber plug connector as claimed in claim 1, wherein the exterior key extends rearwardly from the front of the body.

8. The fiber plug connector as claimed in claim 1, wherein the exterior key is a modification to a conventional rotational alignment key of the fiber plug connector.

9. A connection system comprising:
a first receptacle defining a first port having opposing flat sides interconnected by opposing curved sides to define an interior of the first port, a first of the flat sides defining a first slot recessed therein, the first slot being disposed symmetrically between the opposing curved sides;

a first MPO plug connector configured to be inserted into the first port of the first receptacle, the first MPO plug connector including a first key configured to fit within the first slot of the first receptacle when the first MPO plug connector is inserted into the first port of the first receptacle, the first MPO plug connector terminating a first number of optical fibers, the first key identifying the first number of optical fibers terminated by the first MPO plug connector;

a second receptacle defining a second port having opposing flat sides interconnected by opposing curved sides to define an interior of the second port, a first of the flat sides of the second port defining a second slot recessed therein, the second slot being disposed asymmetrically between the opposing curved sides; and a second MPO plug connector configured to be inserted into the second port of the second receptacle, the second MPO plug connector including a second key configured to fit within the second slot of the second receptacle when the second MPO plug connector is inserted into the second port of the second receptacle, wherein the second slot would inhibit insertion of the first MPO plug connector by interaction between the first key and the first flat side of the second port, the second MPO plug connector terminating a second number of optical fibers, the second number of optical fibers being different from the first number of optical fibers, the second key identifying the second number of optical fibers terminated by the second MPO plug connector.

10. The connection system of claim 9, wherein the first MPO plug connector is one of a plurality of identical first MPO plug connectors that each terminate the first number of optical fibers; and wherein the second MPO plug connector is one of a plurality of identical second MPO plug connectors that each terminate the second number of optical fibers.

11. The connection system of claim 9, wherein the second MPO plug connector includes a third key disposed at an opposite side of the second MPO plug connector from the second key.

12. The connection system of claim 9, wherein the second key of the second MPO plug connector serves as a rotational alignment key.

13. The connection system of claim 9, wherein the second slot cooperates with a larger slot to define a keyway for the second key of the second MPO plug connector.

14. The connection system of claim 9, wherein the second key of the second MPO plug connector is disposed at a top of the second MPO plug connector and asymmetrically located between opposite sides of the second MPO plug connector extending away from the top.

15. The connection system of claim 9, wherein the second key extends rearwardly from a front of the second MPO plug connector.

\* \* \* \* \*